Dec. 23, 1930. E. NOBLES 1,786,360
LINE POLE SETTING DEVICE
Filed Aug. 27, 1928 2 Sheets-Sheet 2
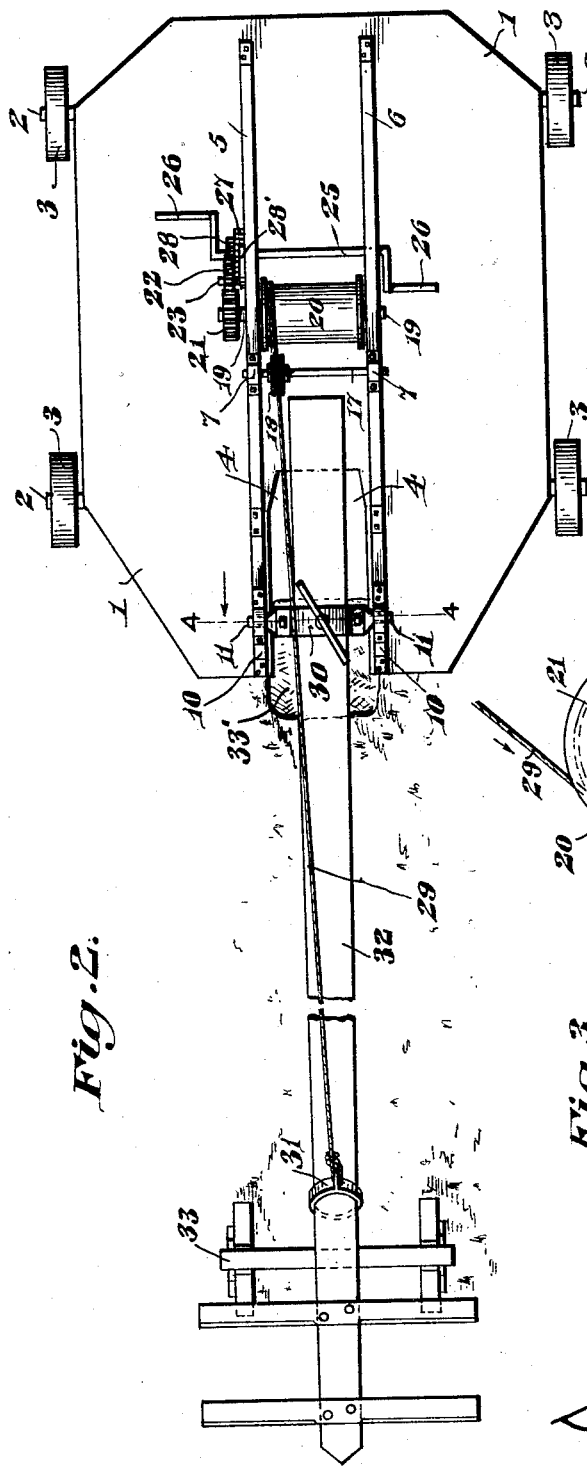
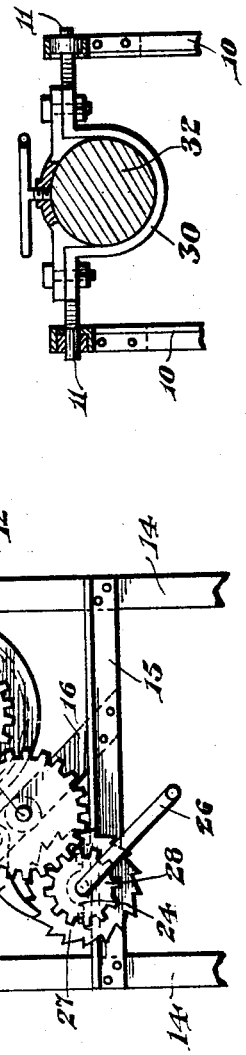
INVENTOR.
Edward Nobles,
BY
Geo. F. Kimmel
ATTORNEY.

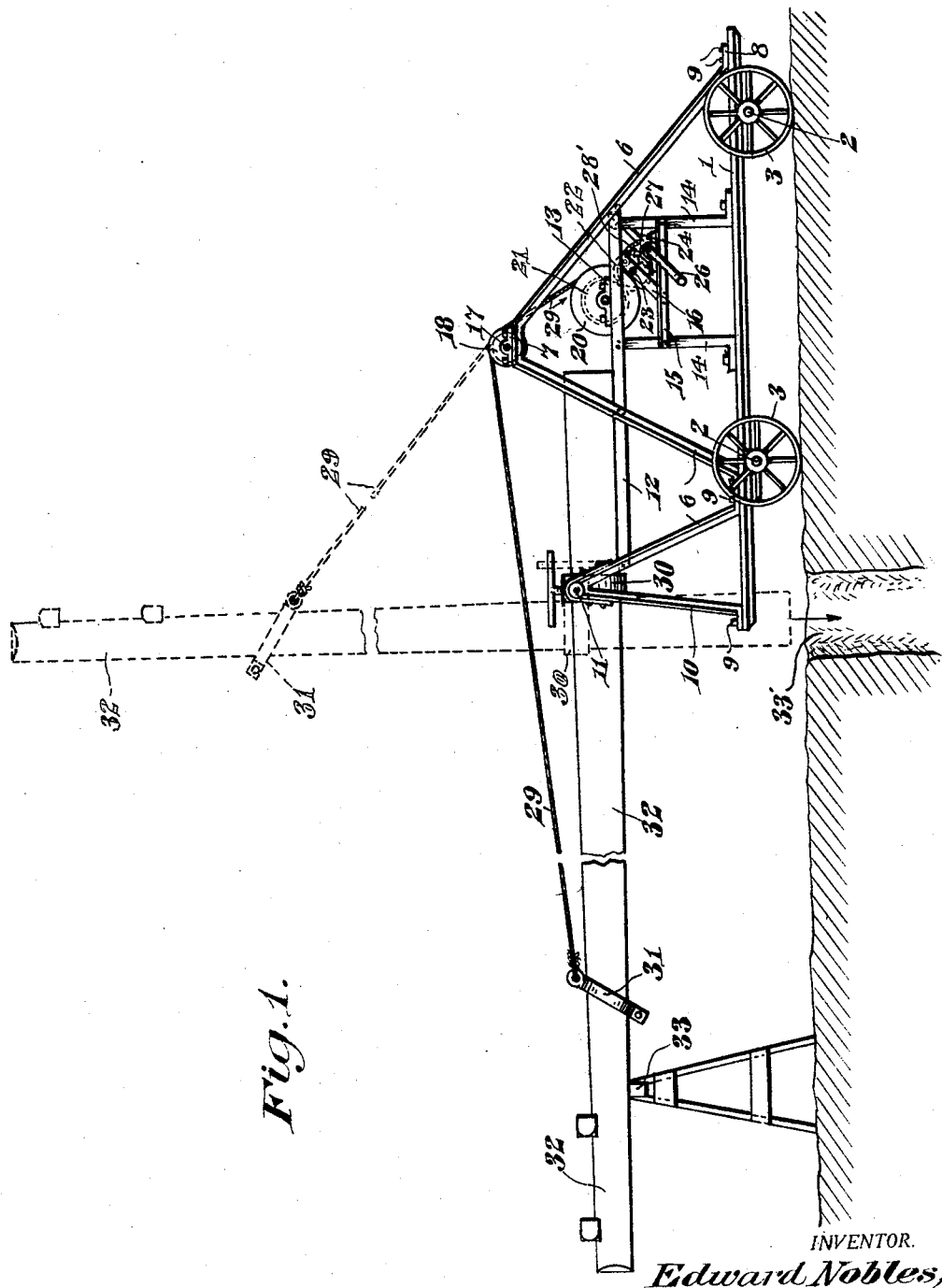

Patented Dec. 23, 1930

1,786,360

UNITED STATES PATENT OFFICE

EDWARD NOBLES, OF POCATELLO, IDAHO

LINE-POLE-SETTING DEVICE

Application filed August 27, 1928. Serial No. 302,411.

This invention relates to a device for setting line poles, and has for its object to provide, in a manner as hereinafter set forth, a device of such class for expeditiously setting line poles at a material saving in the cost of labor with respect to the present manner employed.

In setting the poles at present, it takes several men with pike poles and one or two men with an X frame to raise a pole and slide it into place. It is a hazardous performance and accidents have happened whereby the men raising the pole have not placed their pike points into the pole properly and then the pole would slip and fall, and result at times in serious accidents, and to overcome any danger, in connection with the setting of the pole, is another object of the invention and which is obtained by a setting device so constructed and arranged to eliminate the necessity of men being under the pole to push it upwardly, as the device in accordance with this invention, provides for the pulling up of the pole without any manually pushing action on the latter as is the case at present.

Further objects of the invention are to provide, in a manner as hereinafter set forth, a device of the purpose referred to, which is simple in its construction and arrangement, strong, durable, compact, thoroughly efficient in its use, conveniently operated, readily assembled, reducing the possibility of accidents to a minimum, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a device, in accordance with this invention, showing the pole in full lines in lower position and in dotted lines in elevated or set position.

Figure 2 is a top plan view thereof.

Figure 3 is a fragmentary view in side elevation.

Figure 4 is a section on line 4—4 Figure 2.

A device for setting poles, in accordance with this invention, comprises a carriage consisting of a platform 1, having connected therewith, at each side thereof, as well as projecting therefrom axles 2 carrying supporting wheels 3. The platform 1, centrally of its forward portion, is formed with a cut out 4 which extends lengthwise thereof and is of greater width than the pole to be set. The cut out 4 extends through the forward edge of the platform 1, extends a substantial distance rearwardly of such forward edge and provides a clearance for the pole when elevating and lowering the latter.

Positioned upon the platform 1, is a pair of upstanding supports of substantially inverted V-contour. The supports are indicated at 5, 6 and each of which at its top is formed with a bearing 7. The supports 5, 6, at their lower ends are flanged as at 8 and extending therethrough are holdfast devices 9 for fixedly securing the supports to the platform.

Secured upon the upper face of the platform 1, forwardly with respect to the supports 5, 6 are standards 10 arranged in spaced relation and each of which has its upper end provided with a bearing 11. The standards 10 are of less height than the supports 5, 6 but arranged in alignment with respect thereto. The upper portions of the standards are spaced a substantial distance forwardly of the front sides of the supports 5, 6. The standards 10 are connected to the supports 5, 6, by longitudinally extending supporting bars 12, which are arranged below the upper ends of the supports and standards and each of the bars 12 has secured to its top edge, in proximity to its rear end a bearing 13. In cross section the bars 12 are of angle contour. Each bar 12 is mounted on a pair of uprights 14, connected together by a brace member 15. Each bar 12 is connected to a brace member 15 by an inclined brace 16.

Mounted in the bearings 7 is a shaft 17, carrying a grooved pulley 18 which can shift lengthwise of the shaft. Journaled in the bearings 13 is a drum shaft 19, provided with a drum 20 which is positioned between the bars 12. One end of the shaft 19 exteriorly of a bar 12 is provided with a gear wheel 21, which meshes with a gear wheel 22 mounted on a stub shaft 23 connected to a brace 16. The brace members 15 are provided with bearings 24, in which is journaled a shaft 25 provided at each end with a crank 26. Fixed to the shaft 25, exteriorly of a brace member 15, is a ratchet wheel 27 and a pinion 28. Coacting with the ratchet wheel 27, is a pivoted dog 28′ which is supported from a brace element 16. The pinion 28 meshes with the gear wheel 22 whereby when the shaft 25 is rotated the drum 20 will be revolved to wind thereon an elevating cable 29 which travels through the grooved pulley 18. The drum 20 is latched from rotation and in a direction opposite to that which is revolved on the rotation of the shaft 25 by the dog 28′. When the dog 28′ is moved clear of the ratchet wheel 27 the drum can be revolved in either direction.

Arranged above and transversely with respect to the opening 4 and intermediate the ends of the latter is a clamp 30 for connection to the butt end of the pole 32. The clamp 30 is formed of an upper and a lower part detachably connected together and with the upper part carrying a clamping screw for binding the butt end of the pole 32 to the clamp. The lower part of the clamp is provided with oppositely disposed pintles or protuberances 11 for pivotally mounting the clamp in the upper ends of the standards 10. A pole coupling member is indicated at 31 and which is in the form of a sectional annulus. The member 31 has its rear provided with means for connecting the forward end of the elevating cable 29 thereto. The member 31 is formed in a manner so that it can be readily connected to and disconnected from the pole 32. The member 31 when connected to pole 32 encompasses the latter.

The pole is indicated at 32 and the coupling member is connected therewith and the pole has also connected thereto the clamping member 30, and this latter is of a construction so that it can be connected and disconnected to the pole 32 when desired.

A removable support 33 is employed for the forward end of the pole 32 prior to the elevating of the pole by the device.

The device is operated in the following manner:—

The post hole 33′ having been previously dug, the device is run up to it and with the cutaway portion of the platform or rather opening 4 of the platform placed around the hole in the manner as shown in Figure 2. If necessary when the pole is of such size that it requires the setting of the device solidly, the wheels 3 can be removed and the device fastened down, in any manner, so that it will be safely anchored. The pole 32 is mounted on the support 33 and the butt end of the pole is secured to the pivoted clamping device 30 and which holds the pole 32 securely in place while being elevated or raised. The coupling member 31 is then positioned on the pole at a point somewhere on the upper half thereof or wherever deemed necessary. The cable 29 is then attached to the member 31 and with the cable 29 positioned to travel over the grooved pulley 18. The extended portion of the cable is of a length so that it will give a sufficient pull on the forward part of the pole to raise it. The pulley 18 revolves on the shaft 17 and shifts lengthwise of the shaft as the cable is wound or unwound on the drum 20. The train of gearing operated from the shaft 25 provides for the operation of the drum to wind the cable 29 to provide for the elevating of the pole 32, and as the forward part of the pole 32 is elevated, the pole swings with the pivoted clamp 30, so that the butt end of the pole will pass into the hole 33′. After the pole has been set, the clamp 30 is removed, and as the diameter of the member 31 is greater than the diameter of the pole 32, the said member 31 falls to the lower end of the latter and is removed.

The shaft 25, when rotated to provide for the operation of the gear frame to revolve the drum, is operated from each end, that is to say two men are employed to rotate the shaft. When the pole is in the vertical position as shown in dotted lines in Figure 1, the clamp 30, which is preferably in the form of a screw clamp, is released after the pole slides into the hole 33.

It is thought the many advantages of a device for the purpose set forth, and in accordance with this invention, can be readily understood, and although the preferred embodiment of the invention is as illustrated and described, yet it is to be understood that changes in the details of construction can be had which will fall within the scope of the invention as claimed.

What I claim is:—

1. A device for setting line poles comprising a mobile structure including a platform having its forward portion provided with a cutout opening through its forward end, a cable winding and unwinding means on said platform rearwardly of the inner end of said cutout, a pair of standards secured on said platform forwardly of said means and each positioned on one side of said cutout at the forward portion of the latter, a releasable, combined clamping and binding element positioned between said standards, said element including two parts for encompassing the butt end of a pole, one of said parts pivotally mounted on the upper end of the standards and the other of said parts carrying means for binding the pole to said element, a pole coupling member in the form of an annulus for encompassing the pole forwardly of said element, and an elevating cable winding on and off said means, extending over said element and having its forward end connected to the rear of said member.

2. A device for setting line poles comprising a mobile structure including a platform having the forward part thereof formed with a cutout opening through its forward end, a cable winding and unwinding means on said platform rearwardly of the inner end of the cutout, a pair of standards secured on said platform forwardly of said means and arranged at each side of said cutout, the upper ends of said standards positioned in proximity to the forward end of the cutout, a releasable, combined clamping and binding element arranged between said standards and extending transversely of said opening, said element including a pair of parts, one pivotally mounted on the upper end of the standards and the other carrying a screw for binding a pole to said element, a pole coupling member in the form of an annulus for encompassing the pole forwardly of said element, and an elevating cable winding on and off said means, extending over said device and having its forward end connected to the rear of said member.

3. A device for setting line poles comprising a mobile structure including a platform having the forward part provided with a cutout opening at its forward end, said cutout disposed centrally of said platform and extending a substantial distance rearwardly from such forward end, a drum supported on the platform rearwardly of the inner end of the cutout, a cable winding on and off said drum, means for rotating the drum in opposite directions for winding and unwinding the cable, a pair of standards secured on said platform forwardly of said drum and arranged at each side of said cutout, said standards having their ends positioned in close proximity to the forward edge of said platform, a releasable combined clamping and binding element arranged between said standards, said element including two parts for encompassing the butt end of a pole, one of said parts pivotally mounted on the upper ends of the standards and the other of said parts carrying a screw for binding the pole against said element, a pole coupling member in the form of an annulus for encompassing the pole forwardly of said element, and said cable having its forward end connected to the rear of said member, said cable extending over said element.

In testimony whereof, I affix my signature hereto.

EDWARD NOBLES.